April 30, 1968 R. GILLMAN ETAL 3,380,257
PORTABLE DOCK
Filed May 20, 1966
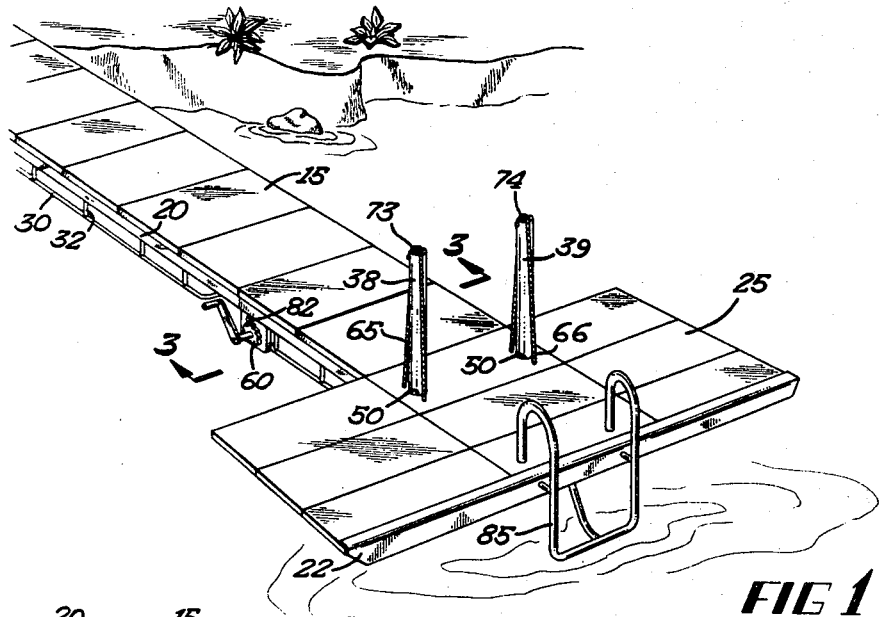
FIG 1
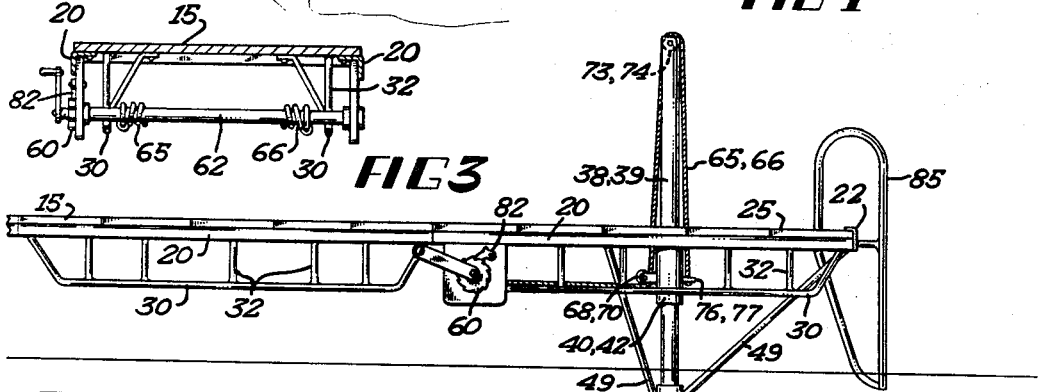
FIG 3
FIG 2
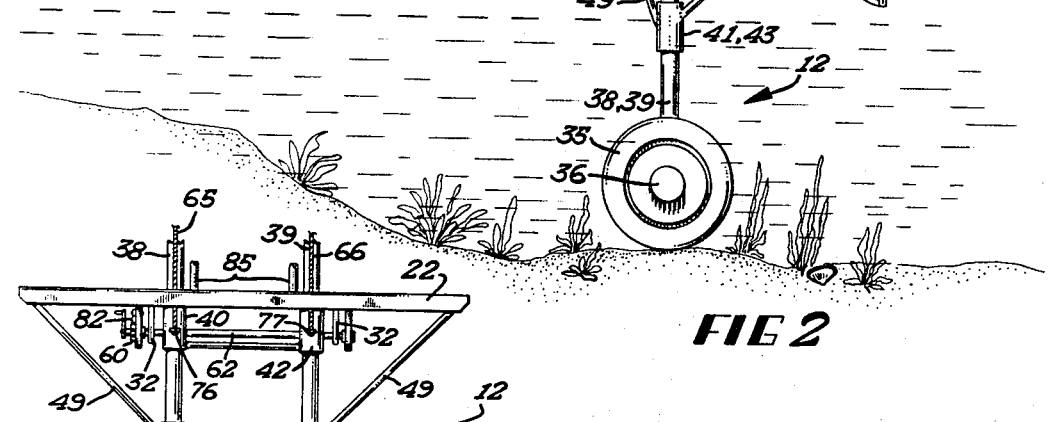
FIG 4
INVENTOR.
ROBERT GILLMAN,
MICHAEL R. LINDER
BY
Schroeder, Siegfried
& Ryan ATTORNEYS

United States Patent Office 3,380,257
Patented Apr. 30, 1968

3,380,257
PORTABLE DOCK
Robert Gillman and Michael R. Linder, both of
Dassel, Minn. 55325
Filed May 20, 1966, Ser. No. 551,802
5 Claims. (Cl. 61—48)

ABSTRACT OF THE DISCLOSURE

A portable dock having a reinforced support structure on which is mounted wheel supports at one extremity of the same, the wheel supports being relatively movable by sleeves mounted on the same which are raised and lowered to engage the reinforced support structure to move the dock relative to the wheel supports. The sleeves are moved by a pulley and cable system operated from a remote winch positioned on the reinforced support structure.

---

Our invention relates to piers and dock structures and more particularly to an improved portable dock which is adapted for easy erection and installation in usage and may be readily removable for transportation and storage.

Portable piers and docks have previously been used. Such prior structures, however, have not been readily adapted for easy installation and removal from water sites. Further, such structures have not been readily transportable to facilitate widespread usage of the same. In addition, such prior structures are not applicable to all installation sites because of lack of adjustment or, where adjustable, are so complex in construction as to make them impractical and difficult to use.

The present invention is directed to an improved portable dock which may be readily towed to any desired location through the use of a wheel support at one extremity of the same. Such a dock structure is readily installed at any site merely by moving the structure on its wheel support to a desired location, rolling the same into the water until one end of the dock rests on a shore level. The water end of the dock structure which is supported by the wheel support is readily adjustable in height to insure that the dock structure may be positioned at any desired level above the water for usage. This improved design includes a simplified elevating mechanism for level adjustment.

Therefore it is an object of this invention to provide an improved portable dock.

Another object of this invention is to provide in an improved portable dock a simplified structure for elevating the end of the dock relative to a wheel support for the same.

A further object of this invention is to provide an improved portable dock which is balanced on a support with an ample surface space beyond the support for varying activities.

Another object of this invention is to provide an improved portable dock which is simple in design, low in cost and easy to use and maintain.

These and other objects of this invention will become apparent from a reading of the attached description together with the drawings wherein:

FIGURE 1 is a perspective view of the improved portable dock,

FIGURE 2 is a side elevation view of the improved portable dock,

FIGURE 3 is a portion of the side elevation view of the improved portable dock, and FIGURE 4 is a sectional view of the improved portable dock of FIGURE 1 taken along the lines 4—4 therein to show a portion of the winch of the elevating mechanism for the same.

Our improved portable dock is shown generally at 10 as comprising an elongated approach structure with an enlarged end or platform section. This dock structure is adapted to be positioned with one extremity on the ground or shore surface and the other extremity supported in the water through contact of a wheel support structure 12 with the ground. The elongated dock structure may be made of any suitable material and is shown herein as comprising plywood type sheeting or boards 15 connected to angle iron side braces 20 and end braces 22 to provide a uniform width throughout the general extent of the dock. At the platform or end section 25, a similar structure is incorporated with the plywood sheeting or boards covering the upper surface thereof and being supported by the angle iron side brace sections and end brace sections 20, 22 respectively. On the undersurface of the dock, the angle iron side bracing has mounted thereon a reinforcing structure in the form of tie rods 30 and upright braces 32 together with cross braces (not shown) which are welded or suitably connected together and to the angle iron edging 20, 22 to provide a trestle like support to reinforce the side braces and provide an elongated unitary and rigid structure. The wheel support structure is formed of a plurality of conventional wheels 35 such as automobile wheels which are mounted on a transversely extending axle 36 which in turn carries an upright support member 38, 39 positioned on the axle at substantially the same spacing as the width of the elongated portion of the dock. Each of the upright support members 38, 39 have sleeves 40, 41, 42 and 43 respectively mounted thereto to slidably support the upright members in their end. The upper sleeves 40, 42 are connected to the reinforcing structure formed by the rods 30 and upright members 32 to phsically connect the sleeves to the reinforcing structure. In addition, lower sleeves 41, 43 are connected by strut support rods 49 to the reinforcing structure for support. The top surface of the dock structure at the enlarged portion has a pair of apertures 50 therein through which the upright support members 38, 39 extend to be normally exposed, at least in part, above the surface of the dock. As will be hereinafter noted, movement of the upright support members 38, 39 which are slidably mounted and guided in the sleeve members 40, 41, 42, 43 relative thereto will cause movement of the entire dock surface relative to the upright members to elevate the dock above the wheel structure 12. Such elevation is effected or controlled by means of a winch 60 journaled on the end of a transversely extending shaft 62 which is rotatably mounted in the pair of braces 32 of the reinforcing structure and hence connected to the dock structure. The winch at the connected shaft includes a pair of cables 65, 66 which are connected at one extremity and wound around the shaft 62 being directed to the sleeve members 40, 42 guiding the respective upright supports 38, 39 and through pulleys or cable guides 68, 70 thereon. The top of the upright support members 38, 39 carry a second set of cable guides or pulleys pivotally mounted at the top of the same, as indicated at 73, 74 respectively such that the cables 65, 66 will be directed through the pulleys 68, 70 respectively and over the tops of the upright support members through the cable guides or pulleys 73, 74 with the free extremities of the cables being secured in the respective sleeve members as at 76, 77 respectively. The individual cables are of the same length and the winch 60 and journaled shaft 62 respectively are mounted intermediate the free end of the dock structure and the upright members such that upon rotation of the winch, the length of the cables 65, 66 may be increased or decreased to move the sleeve member 40, 42 and hence the dock surface connected thereto through the reinforcing structure to elevate the dock relative to the wheel support 12. The winch 60 includes a suitable latching mechanism 82 which enables the winch to lock or hold the shaft 60 with the cables 65, 66 connected thereto in any desired position such that the cables may elevate the dock to any desired position and hold the same at such a position. The positioning of the upright support members on the dock surface or at the reinforcing structure supporting the same is normally located at a point that the wheel structure will support approximately 80% of the dock's weight. Thus the majority of the load for the portable dock will be mounted or positioned on the wheel support structure such that the dock may be readily moved for installation and removal purposes. The end of the enlarged platform section 25 includes a suitable ladder connected thereto and indicated at 85 which permits access to the dock surface at the platform from the water.

With our improved portable dock, it is possible to position the dock on a shoreline with the free extremity in the water for use as a portable dock under most all conditions of terrain. The improved dock may be suitably connected to a transporting mechanism or supported and carried at the free extremity thereof to be rolled into the water and removed therefrom. The winch will permit the dock surface to be elevated relative to the wheel support so that the dock may be placed in varying water depths up to the limits defined by the height of the upright members 38, 39. Further the improved dock structure may be readily transported to a storage position because of the conventional wheel support structure 12.

In considering this invention it should be remembered that the present disclosure is intended to be illustrative only and the scope of the invention should be determined by the appended claims.

What is claimed is:

1. A portable dock comprising, a single elongated dock structure with a reinforcing structure on the undersurface of the same, a pair of upright supports connected to a pair of wheels supported on an axle, sleeve means connected to the reinforcing structure of the dock near one end of the elongated dock structure, and slidably mounting the upright supports therein, said upright supports being positioned through apertures in the dock structure and adapted to extend beyond the upper surface of the same, a winch mounted on the reinforcing structure removed from the upright supports and between the upright supports and the other end of the dock, cable guide means mounted on the sleeve means and additional cable guide means mounted on the upper extremity of the upright supports being adapted to guide cable therethrough, a cable for each of the upright supports attached at one extremity to the winch and extending through the cable guide means to the sleeve means and the upright supports being secured at its other extremity to the sleeve means such that upon operation of the winch to shorten the cable the dock structure will be elevated relative to the wheels on the upright supports, said dock structure being adapted to rest on the ground at the other end of the dock structure and supported by the wheels positioned in the water with the elevation of the dock structure above the water being adjusted by the winch and the cable, said winch including a journaled shaft upon which the cables are wound with the journaled shaft being mounted on the reinforcing structure under the elongated dock and with the cables being attached to the shaft such that each of the cables extend to one of the upright supports and through the cable guide means on the sleeve means associated therewith to raise the sleeve means and hence the dock structure uniformly with operation of the winch.

2. A portable dock comprising, a single elongated dock structure with a reinforcing structure on the undersurface of the same, a pair of upright supports connected to a pair of wheels supported on an axle, said elongated dock structure and said reinforcing structure including a section at said one end of the same which is enlarged in width from the remaining dock structure and through which the pair of upright supports extend, sleeve means slidably mounting the upright supports and connected to the reinforcing structure near one end of said elongated dock structure, said upright supports being positioned through apertures in the dock structure and adapted to extend beyond the upper surface of the same, a winch mounted on the reinforcing structure removed from the upright supports and between the upright supports and the other end of the dock, pulleys mounted respectively on the sleeve means for each of the upright supports and at the top of the upright supports, cables attached to the winch and extending through the pulleys to the sleeve means and the upright supports being secured at its extremity to the sleeve means such that upon operation of the winch to shorten the cable the dock structure will be elevated relative to the wheels on the upright supports, said winch including a journaled shaft upon which the cables are wound with the journaled shaft being mounted on the reinforcing structure under the elongated dock and with the cables being connected to the shaft and separated a distance equal to the spacing between the upright supports such that each of the cables extend to one of the upright supports and through the pulleys on the sleeve means associated therewith to raise the sleeve means and hence the dock structure uniformly with the operation of the winch, said dock structure being adapted to rest on the ground at the other end of the dock structure and supported by the wheels positioned in the water at said one end of the dock structure with the elevation of the dock structure above the water being adjusted by the winch and cables.

3. The portable dock of claim 2 in which the cables are positioned beneath the side edges of the dock structure and the upright supports are included in the enlarged section of the dock structure and spaced apart the width of the dock.

4. The portable dock structure of claim 3 in which the upright supports are positioned with respect to the extent of the dock structure so as to support approximately 80% of the weight of the dock.

5. The portable dock of claim 4 in which the length of the upright supports limit the elevation of the dock structure relative to the wheels and the winch includes releasable means for retaining the cables in any desired position.

References Cited
UNITED STATES PATENTS

| | | | |
|---|---|---|---|
| 202,415 | 4/1878 | Cumming | 61—46.5 |
| 1,975,049 | 9/1934 | Middlebrook | 61—48 X |
| 2,548,265 | 4/1951 | Jindrich | 182—145 X |
| 3,081,601 | 3/1963 | Fentiman | 61—48 |

FOREIGN PATENTS

| | | |
|---|---|---|
| 598,528 | 5/1960 | Canada. |

JACOB SHAPIRO, *Primary Examiner.*